Aug. 14, 1951 A. REYMANN 2,563,960
GATE AND HINGE CONSTRUCTION
Filed Aug. 15, 1946
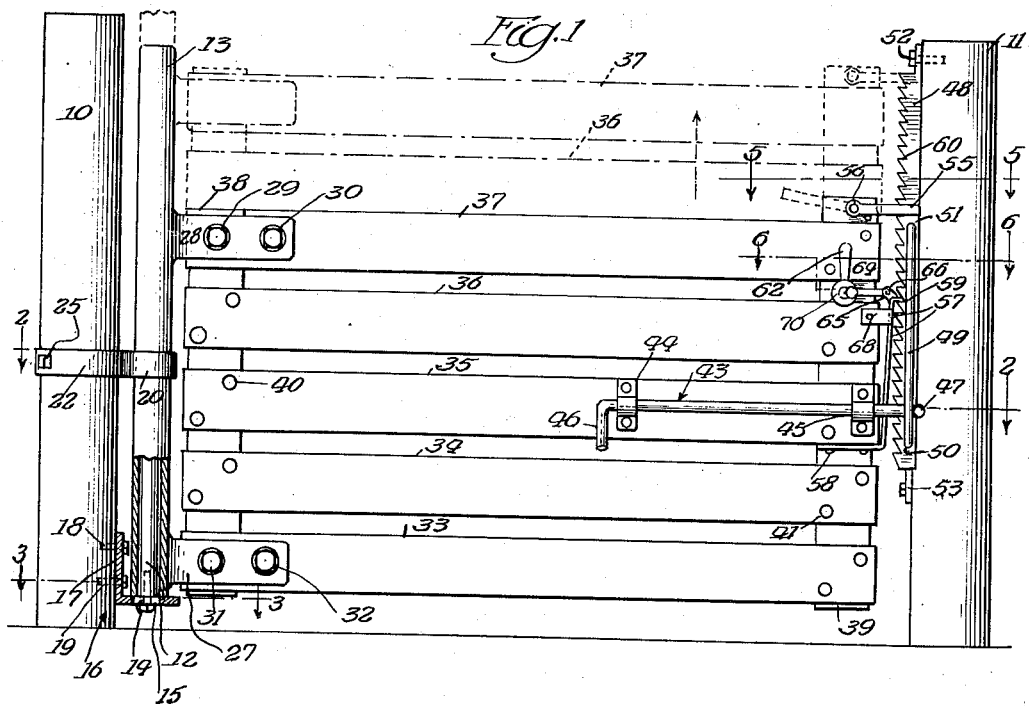
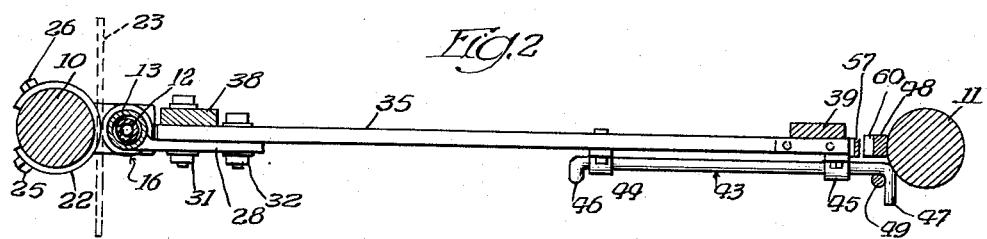
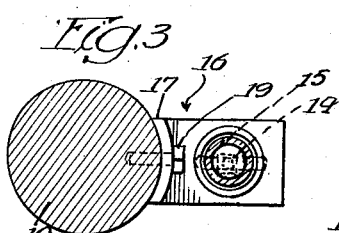
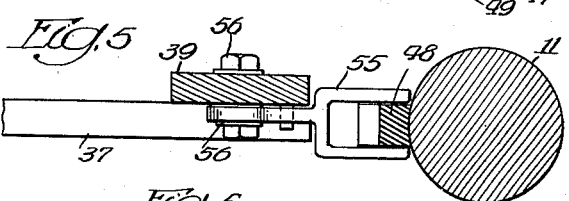
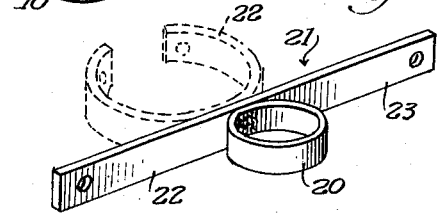
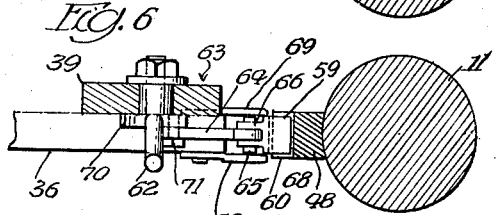
Inventor:
Alois Reymann,
By Clarence J. Loftus
atty.

Patented Aug. 14, 1951

2,563,960

UNITED STATES PATENT OFFICE 2,563,960

GATE AND HINGE CONSTRUCTION

Alois Reymann, Sandwich, Ill.

Application August 15, 1946, Serial No. 690,726

2 Claims. (Cl. 16—132)

The present invention relates to gates, and, while it is of particular utility as embodied in an all-purpose gate for a farm or other large close, it is not limited to such an application.

The confinement of cattle and horses within an enclosure requires a barrier of considerable height. Prior-art swinging gates of a height sufficient for this purpose have great weight and are cumbersome to operate. It is an object of my invention to provide a relatively light-weight gate which is adjustable to present a high barrier for the confinement of cattle and horses within a close or for other purposes requiring a high barrier.

On the other hand, sheep and other smaller animals may be confined and other purposes served by a gate of lesser height. It is desirable to provide one gate structure which can serve as an all-purpose barrier. It is an object of the invention to provide a multi-purpose adjustable gate which requires only one set of hinges and a relatively small quantity of gate material. Under present economic conditions and the prevailing high cost of lumber, the most commonly used gate material, the accomplishment of this object is important.

Another object of the invention contemplates the providing of an improved hinge structure for swingably supporting and withstanding the considerable stresses exerted by a cantilever gate.

It is a primary object of the invention to provide a gate which can easily and securely be adjusted to present a barrier of varying height within a predetermined range.

It is also an object of my invention to provide a gate structure which can be adjusted as to height even when latched against swinging movement.

A further object of my invention contemplates the providing of a gate which can with facility be raised to permit free swinging over obstructions which would otherwise interfere with the operation of the gate.

For a better understanding of the invention, together with other and further objects and capabilities thereof, reference is made to the following description of the accompanying drawings, in which I show an illustrative preferred embodiment of my invention.

In the drawings:

Fig. 1 is a front view of a gate constructed in accordance with the invention, showing in full lines the positions of its parts when it is adjusted to a low position and generally in dashed lines the corresponding positions when it is adjusted to provide a high barrier;

Fig. 2 is a sectional view of the gate, showing the positions of the parts when the gate is latched, this view being taken on line 2—2 of Fig. 1;

Fig. 3 is a sectional view of the gate, taken on line 3—3 of Fig. 1, showing the adjustable bracket connection between gate and post;

Fig. 4 is a perspective view of the strap member and;

Figs. 5 and 6 are sectional views taken respectively on lines 5—5 and 6—6 of Fig. 1, and showing the fork and the height-adjustment lever and spring, respectively.

Two posts 10 and 11, preferably of wood, serve as a foundation for the gate proper and associated parts. A hinge structure comprising an upstanding tubular inner member 12 and a tubular outer member 13 is provided. Members 12 and 13 are of metal and are concentrically arranged so that tubular member 13 is freely rotatable on member 12. The bottom of member 12 is adjustably secured to post 10 by a nut and bolt 14, the latter being adjustably positioned within a slot 15 in the bottom leg of bracket 16. The upstanding leg 17 of this bracket is secured to the post 10 by suitable fastening expedients such as bolts 18 and 19. Bolt 14 can be loosened and the gate so adjusted that the tubular members assume the vertical and other desired angles. If post 10 should not be substantially vertical, for example, this adjustment facilitates operation of the gate.

The outer tubular member 13 is both slidably and rotatably mounted within a journal member 20, rigidly secured to a strap 21 which comprises arcuate portions 22 and 23. These arcuate portions embrace post 10 and are secured thereto by screw-threaded bolts 25 and 26, respectively. This hinge, comprising strap 21, journal 20, outer member 13 rotatably journaled within the bearing, and inner tubular member 12 on which the outer member 13 is rotatably mounted, can withstand very strong stresses imposed by the cantilever gate. A force couple is made up by the forces of tension acting on the strap 21 and the forces of compression acting on the bracket 16, when the gate is supported. Since the forces between members 12 and 13 are distributed over their surfaces, a strong hinge construction is provided.

Outer member 13 and the barrier proper are slidable axially with respect to inner member 12 and adjustable to any selected vertical position within the limits permitted by abutment of arm 27 against bearing 20 and outer member 13 against bracket 16.

The gate proper is secured to arms 27 and 28, integral with outer tubular member 13, by bolts and nuts 29, 30, 31 and 32. The gate proper consists of five slats 33, 34, 35, 36 and 37, secured in a rigid subassembly by cross-pieces 38 and 39. Elements 38 and 39 are secured to the slats by any suitable means such as the bolts indicated generally at 40 and 41.

In order to latch the gate against swinging movement, regardless of the height to which it has been adjusted, there is provided a latch member 43, slidably secured to slat 35 by brackets 44 and 45. The end portions 46 and 47 of this latch lie in planes at ninety degrees to each other. When handle 46 is down and in the position shown in Fig. 1, end portion 47 passes between rack 48 (Fig. 2) and bar 49 and is at right angles to the bar, so that the gate is firmly latched against swinging movement. However, even when so latched, the gate can be adjusted vertically, since the end portion 47 can slide vertically between bar 49 and rack 48 and post 11. The ends of bar 49 are bent and welded to rack 48 as indicated generally at 50 and 51. Rack 48 has terminal lugs and is secured to post 11 by bolts 52 and 53 which pass through apertures in these lugs.

To permit swinging movement of the gate handle 46 is given an upward turn of ninety degrees, bringing the end portion 47 into parallelism with bar 49 and the latch is then retracted by a pull on handle 46 so that end portion 47 clears rack 48 and bar 49.

In order to protect the gate against unusual forces such as those produced by high winds there is optionally provided a bifurcated fork member 55 pivotally mounted on cross-piece 39 by a suitable expedient 56. The fork 55 can be turned to the position shown in Fig. 5, so that it straddles rack 48, thereby to afford additional protection to the gate, or it can be turned counterclockwise (Fig. 1) through one hundred and eighty degrees when not in use.

The gate is secured against undesired gravitational displacement from any position to which it is adjusted by a spring catch 57 secured to slat 35 by bolts indicated generally at 58. Spring catch 57 is biased toward rack 48. The end portion 59 of this catch cooperates with any one of the teeth 60 on rack 48 in order to secure the gate against vertical displacement.

When it is desired vertically to adjust the gate, end 59 of catch 57 is disengaged from the rack teeth. This disengagement is effected by a counterclockwise (Fig. 1) turn of the height-adjustment lever 62. This lever is pivotally mounted at 63 on cross-member 39. When so turned it operates through a link 64, pivotally secured at 65 to a bifurcated lug 66 integral with spring end 59, to pull end 59 away from the rack teeth. Link 64 is eccentrically pivotally secured to a circular plate 70; plate 70 is integral with and rotated by handle 62. When the gate has been placed in the proper desired vertical position, lever 62 is returned to the position shown in Fig. 1 in full lines.

Should obstructions such as weeds or uneven ground contours tend to prevent free swinging of the gate, it can be adjusted to a higher position to swing over such obstructions.

For the guiding and protection of the spring catch 57 there are provided two guide plates 68 and 69, secured to and projecting out from slat 36.

While there has been shown and described what is at present considered to be the preferred embodiment of my invention, it will be obvious to those skilled in the art that various changes and substitutions of equivalents may be made without departing from the true scope of the invention and it is, accordingly intended in the appended claims to cover all such changes and modifications as fall within the true and proper scope of the invention.

Having thus described my invention, I claim:

1. In a gate, a hinge structure comprising a single hollow cylindrical tubular outer gate-supporting member extending at least the full height of the gate at one side thereof, a single concentric upstanding inner tubular member within said outer gate-supporting member, said gate-supporting member being rotatably mounted and axially slidable on said inner member, means for mounting said members including support means rigidly secured to the lower portion of said inner member and abutting said outer member and journal means embracing a higher portion of said outer gate-supporting member.

2. A gate comprising a barrier, a single hollow cylindrical outer barrier-carrying member extending at least the full height of the gate at one side thereof, two spaced arms integral with said carrying member for rigidly securing said barrier to said carrying member, a single concentric upstanding inner tubular member within said outer gate-supporting member, said carrying member being rotatably mounted on and axially slidable on said inner member, a post, means for rigidly securing the lower end of said inner member to said post, a journal member rigidly secured to said post and apertured to embrace said outer member said journal member having a width small with respect to the distance between said spaced arms and being located therebetween, whereby said outer member is axially slidable on said inner member within the limits defined by abutment of the lower one of said spaced arms against said journal member and abutment of said outer member against said securing means, whereby to provide for adjustment of the effective height of said barrier.

ALOIS REYMANN.

REFERENCES CITED

The following references are of record in the file of this patent:

UNITED STATES PATENTS

| Number | Name | Date |
|---|---|---|
| 99,822 | Bonney | Feb. 15, 1870 |
| 171,158 | Moore | Dec. 14, 1875 |
| 505,195 | Cullen | Sept. 19, 1893 |
| 791,223 | Soesbe et al. | May 30, 1905 |
| 803,691 | Hibner | Nov. 7, 1905 |
| 881,119 | Goss | Mar. 10, 1908 |
| 942,716 | Deskins | Dec. 7, 1909 |
| 989,649 | Schenck | Apr. 18, 1911 |
| 1,078,375 | Porter | Nov. 11, 1913 |
| 1,116,867 | Anderson | Nov. 10, 1914 |
| 2,297,023 | Phelan | Sept. 29, 1942 |

FOREIGN PATENTS

| Number | Country | Date |
|---|---|---|
| 13,435 | Great Britain | June 16, 1898 |
| 26,716 | Austria | Dec. 10, 1906 |